United States Patent
Hu

(10) Patent No.: US 9,774,813 B2
(45) Date of Patent: Sep. 26, 2017

(54) HUMAN-COMPUTER INTERACTION METHOD AND CONTROLLED TERMINAL AND REMOTE-CONTROL DEVICE UTILIZING THE SAME

(71) Applicant: MediaTek Singapore Pte. Ltd., Singapore (SG)

(72) Inventor: Xu-tong Hu, Heifei (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/962,518

(22) Filed: Dec. 8, 2015

(65) Prior Publication Data
US 2016/0165172 A1   Jun. 9, 2016

(30) Foreign Application Priority Data
Dec. 9, 2014   (CN) .......................... 2014 1 0750984

(51) Int. Cl.
| | |
|---|---|
| *H04N 5/445* | (2011.01) |
| *H04N 5/44* | (2011.01) |
| *H04N 21/422* | (2011.01) |
| *H04N 5/50* | (2006.01) |

(52) U.S. Cl.
CPC ....... *H04N 5/44513* (2013.01); *H04N 5/4403* (2013.01); *H04N 21/42215* (2013.01); *H04N 5/50* (2013.01); *H04N 2005/4421* (2013.01); *H04N 2005/4442* (2013.01); *H04N 2005/44517* (2013.01)

(58) Field of Classification Search
CPC ............ H04N 5/44513; H04N 5/4403; H04N 21/42215; H04N 5/50; H04N 2005/4421; H04N 2005/4442; H04N 2005/44517
See application file for complete search history.

(56) References Cited

U.S. PATENT DOCUMENTS

| | | | | |
|---|---|---|---|---|
| 5,287,109 | A * | 2/1994 | Hesse .................... | G08C 19/28 340/309.8 |
| 6,998,997 | B2 * | 2/2006 | Stevenson .............. | G08C 19/28 340/12.28 |
| 7,463,164 | B2 * | 12/2008 | Williams ............... | G08C 19/28 340/12.14 |
| 8,078,884 | B2 * | 12/2011 | Ramakrishnan .. | G06F 17/30032 713/186 |
| 8,854,555 | B2 * | 10/2014 | Adderly ................... | H04N 5/50 348/388.1 |
| 9,135,814 | B2 * | 9/2015 | Walrant ................. | G08C 17/02 |

(Continued)

*Primary Examiner* — Brian Yenke
*Assistant Examiner* — Sean Haiem
(74) *Attorney, Agent, or Firm* — McClure, Qualey & Rodack, LLP

(57) ABSTRACT

A control method for a controlled terminal and the controlled terminal and a remote-control device utilizing the same are provided. According to the control method for a controlled terminal, a time interval for the controlled terminal to respond to the input operations from a remote-control device is set according to a setting instruction, and the input operations from the remote-control device are processed according to the time interval. Using the above-describe manner, the time interval of the controlled terminal to respond to input operations can be flexibly set to ensure that users can watch TV programs normally, and improve the user experience.

6 Claims, 5 Drawing Sheets

(56) References Cited

U.S. PATENT DOCUMENTS

| | | | |
|---|---|---|---|
| 2001/0022631 A1* | 9/2001 | Scheffler | H04N 5/44 348/731 |
| 2002/0085123 A1* | 7/2002 | Ono | H04N 5/44543 348/584 |
| 2005/0179558 A1* | 8/2005 | Williams | G08C 19/28 340/12.24 |
| 2008/0209229 A1* | 8/2008 | Ramakrishnan | G06F 17/30032 713/186 |
| 2010/0017814 A1* | 1/2010 | Archer | H04N 5/44543 725/14 |
| 2011/0140948 A1* | 6/2011 | Friedman | H04N 5/4403 341/176 |
| 2015/0201148 A1* | 7/2015 | Kim | H04N 5/44591 725/43 |

* cited by examiner

HUMAN-COMPUTER INTERACTION METHOD AND CONTROLLED TERMINAL AND REMOTE-CONTROL DEVICE UTILIZING THE SAME

CROSS REFERENCE TO RELATED APPLICATIONS

This Application claims priority of China Patent Application No. 201410750984.5, filed on Dec. 9, 2014, the entirety of which is incorporated by reference herein.

BACKGROUND OF THE INVENTION

Field of the Invention

The invention relates to human-machine technique, and more particularly to a control method for a controlled terminal and a controlled terminal and a remote-control device utilizing the same.

Description of the Related Art

Watching television (TV) programs has become a more common entertainment activity in everyday life, especially for children and the elderly. Televisions receive TV programs transmitted by different stations. Users can use remote controllers to select the channels on which to watch the TV programs provided by corresponding stations.

Currently, users input the number(s) corresponding to the channels through the remote controllers, and then the televisions automatically switch to the channels after a time interval, thereby accomplishing the channel selection. When users that have slower reaction times, such as children and the elderly, perform the channel-input operations, they look at the controllers to input one number (such as "1") and then look up at the screen of the television to check whether the television has received and is displaying the number that was input. Then they look back down at the controller again to input the next number (such as "6"). However, when they is inputting the next number, the time interval during which the television waits for channel selection may expire, and the television subsequently switches to the wrong channel—in this case, channel "1," not channel "16," as intended by the user. Thus, the user experiences inconvenience and difficulty watching TV programs normally, and the user experience is degraded.

BRIEF SUMMARY OF THE INVENTION

The invention provides a control method for a controlled terminal and a controlled terminal and a remote-control device utilizing the same which is capable of flexibly setting the time interval of the controlled terminal to respond to input operations to ensure users can watch TV programs normally and improve the user experience.

An exemplary embodiment of control method for a controlled terminal is provided. The control method comprises the steps of receiving a setting instruction for setting a time interval; dynamically setting the time interval, wherein the controlled terminal responds to input operations from a remote-control device according to the time interval; and processing the input operations from the remote-control device according to the time interval.

An exemplary embodiment of a controlled terminal is provided. The controlled terminal comprises a processor which is configured to dynamically set a time interval based on a setting instruction, wherein the controlled terminal responds to input operations from a remote-control device according to the time interval, and to process the instruction from the remote-control device according to the time interval.

According to the above-described embodiments, the time interval of the controlled terminal to respond to the input operations of the remote-control device can be flexibly set according to the setting instruction, such that the process which is performed by the controlled terminal in response to the input operations conforms with the expectation of the user, and the user experience is improved.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
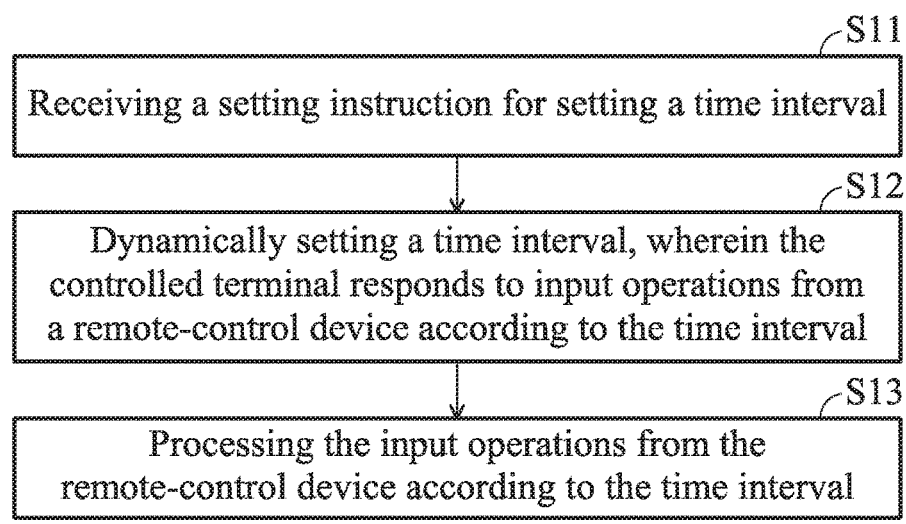
FIG. 1 shows a first exemplary embodiment of a control method for a controlled terminal.

An exemplary embodiment of the invention provides a control method for a controlled terminal. As shown in FIG. 1, the human-computer interaction method comprises the following steps:

Step S11: receiving a setting instruction for setting a time interval;

Step S12: dynamically setting a time interval, wherein the controlled terminal responds to input operations from a remote-control device according to the time interval.

Step S13: processing the input operations from the remote-control device according to the time interval.

The above-described setting instruction is input by a user through a remote controller or automatically generated by the controlled terminal. Since the time interval of the embodiment can be dynamically and flexibly set through the setting instruction, the time interval for the controlled terminal to respond to two input operations of the remote-control device can be flexibly set, such that the processing of the controlled terminal response to the input operations can conform with the expectation of the user, and the user experience is improved. The drawback in the current technique whereby the time interval of the controlled terminal is preset by the system and cannot be adjusted according to the requirements of the individual users is eliminated.

In all embodiments of the invention, to separate from and compare with the current technique, the controlled terminal is preferably implemented by a display terminal, such as a television, the remote-control device is preferably implemented by a remote controller, and the input operations are preferably implemented by channel-selection operations, however, without limitation. In another embodiment, the input operations may be implemented by function-menu selection operations which are controlled by users.

Figure 2:
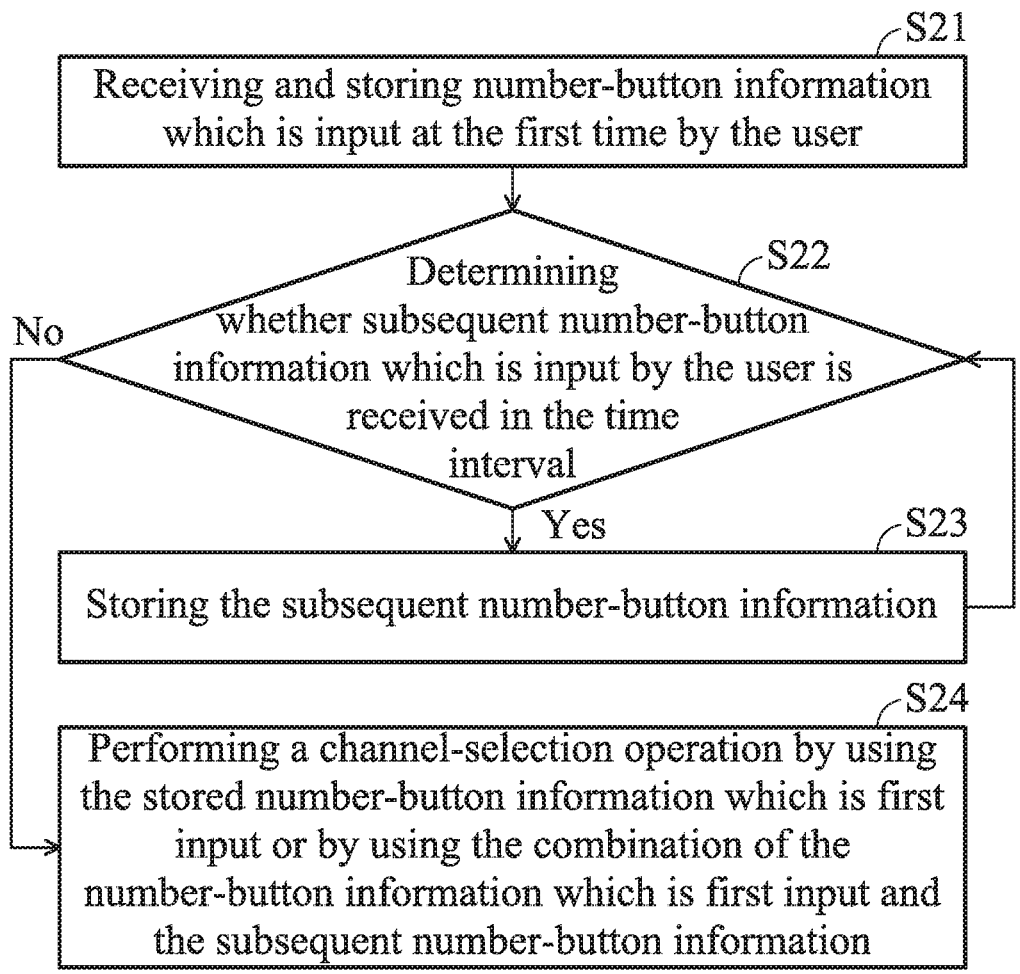
FIG. 2 shows a second exemplary embodiment of a control method for a controlled terminal.

When users with slow reaction time, such as children and the elderly, watch TV programs, they can set the time interval through the setting instruction, for example, the time interval is adjusted upward to 20 sec from 5 sec (the current time interval). By referring to FIG. 2, the step of processing the input operations of the remote-control device according to the time interval comprises the following specific steps:

Step S21: receiving and storing number-button information which is input at the first time by the user.

Step S22: determining whether subsequent number-button information which is input by the user is received in the time interval. Specifically, when the subsequent number-button information which is input by the user is received in the time interval, the method proceeds to Step S23: When the subsequent number-button information which is input by the user is not received in the time interval, the method proceeds to Step S24.

Step S23: storing the subsequent number-button information. Then, the method proceeds to Step S22.

Step S24: performing a channel-selection operation by using the stored number-button information which is first input or by using the combination of the number-button information which is first input and the subsequent number-button information.

For example, the television receives the umber button information which is first input by the user and corresponds to the channel "1", and then the clocking starts. When the subsequent number-button information which is input by the user and corresponds to the channel "6" is received in 20 sec, the stored channel which is selected by the user is 16. When no further number-button information input by the user is received until the time interval of 20 sec expires, the television switches to channel "16". When further number-button information is input by the user, for example corresponding to the numeral "9," and it is received before the time interval of 20 sec expires, the television switches to channel "169".

In the above-described manner, the embodiment can ensure that during a channel-selection process where the user lowers the head to select one channel number, look up to the screen of the television to confirm that the channel number has been received or is displayed, and then lowers the head again to select another channel number, the television does not perform any channel-switching. Accordingly, the channel which is shown on the television screen in response to the channel-selection operation is not different from the channel which is expected by the user, thereby ensuring that the user can watch TV programs normally.

Figure 3:
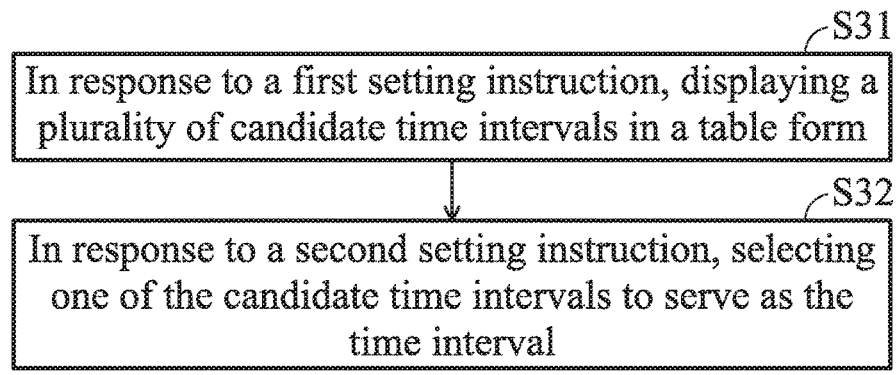
FIG. 3 shows a third exemplary embodiment of a control method for a controlled terminal.

According to the above-described embodiment, the step of setting the time interval for the controlled terminal to respond to the input operations of the remote-control device according to the setting instruction can be accomplished by displaying candidate time intervals through an interface for the user to select. Referring to FIG. 3, the method further comprises the following steps:

Step S31: in response to a first setting instruction, displaying a plurality of candidate time intervals in a table form.

Step S32: in response to a second setting instruction, selecting one of the candidate time intervals to serve as the time interval.

In the embodiment, the first setting instruction is used to retrieve and display the candidate time intervals which are preset by the system of the television. The second setting instruction is used to select one of the candidate time intervals. Specifically, the user inputs the first setting instruction through a remote controller, and the television received the first setting instruction and displays the candidate time intervals in table form on the screen, such as 20 sec, 25 sec, 30 sec etc. . . . . Then, the user inputs the second instruction through the remote controller to select one of the candidate time intervals (such as 20 sec) according to the requirement. Thus, the television sets 20 sec as the time interval for the channel-selection operation.

In other embodiments, the step of setting the time interval for the controlled terminal to respond to the input operations of the remote-control device according to the setting instruction can be also accomplished by the method shown in FIGS. 4-7.

Figure 4:
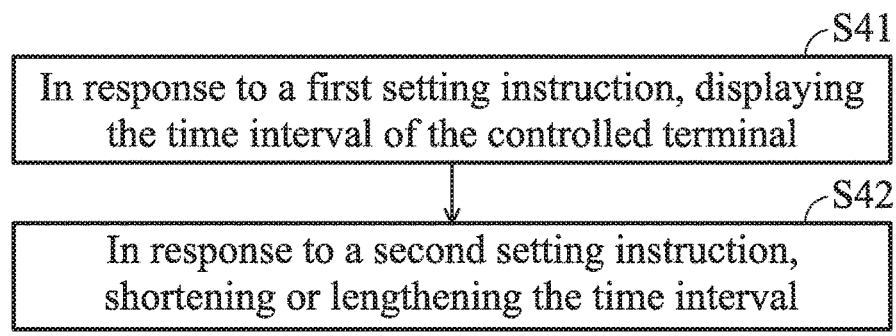
FIG. 4 shows a fourth exemplary embodiment of a control method for a controlled terminal.

Referring to FIG. 4, in an embodiment, the step of setting the time interval for the controlled terminal to respond to the input operations of the remote-control device according to the setting instruction can be accomplished by providing a preset time interval by the controlled terminal for the user to adjust, and it may specifically comprise the following steps:

Step S41: in response to a first setting instruction, displaying the time interval of the controlled terminal.

Step S42: in response to a second setting instruction, shortening or lengthening the time interval.

In the embodiment, the first setting instruction is used to retrieve and display the time interval which is preset by the system of the television. The second setting instruction is used to shorten or lengthen the preset time interval. Specifically, the user inputs the first setting instruction through a remote controller, and the television received the first setting instruction and displays the preset time intervals on the screen, such as 15 sec. Then, the user inputs the second instruction through a function button "+" or "−" on the remote controller to shorten or lengthen the time interval according to the requirement, for example, the time interval is lengthened to 20 sec. Thus, the television sets 20 sec as the time interval for the channel-selection operation.

It should be understood that, in step S41 of another embodiment, several preset time intervals can be displayed in response to the first setting instruction. According to a third setting instruction, the user selects one of the preset time intervals which will be shortened or lengthened for obtaining the time interval of the channel-selection operation.

Figure 5:
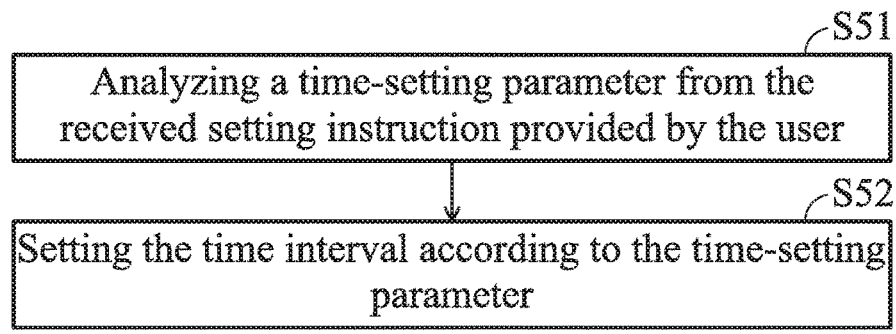
FIG. 5 shows a fifth exemplary embodiment of a control method for a controlled terminal.

Referring to FIG. 5, in an embodiment, the step of dynamically setting the time interval can be accomplished by being directly set by the user, and it may specifically comprise the following steps:

Step S51: analyzing a time-setting parameter from the received setting instruction provided by the user.

Step S52: setting the time interval according to the time-setting parameter.

Figure 6:
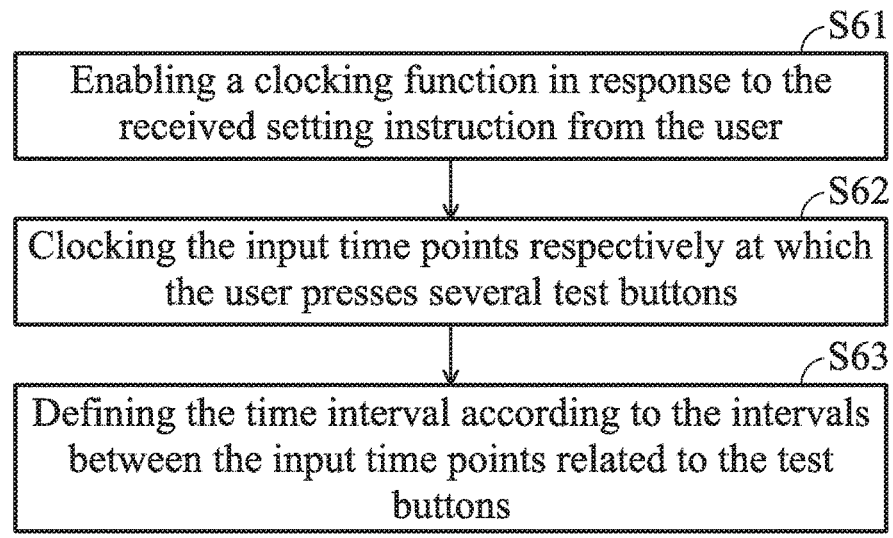
FIG. 6 shows a sixth exemplary embodiment of a control method for a controlled terminal.

Referring to FIG. 6, in an embodiment, the step of dynamically setting the time interval can be accomplished through a sampling operation performed to specifically set the time interval for the user and comprise the following steps:

Step S61: enabling a clocking function in response to the received setting instruction from the user;

Step S62: clocking the input time points respectively at which the user presses several test buttons.

Step S63: defining the time interval according to the intervals between the input time points related to the test buttons.

For example, at the time point when the instruction for the channel-selection operation is received from the user through the remote controller (that is, at the time point when the screen of the television displays the interface related to waiting for channel selection), the clocking starts. When the clocking operation is performed to obtain that the intervals between the time point at which the user selects the channel "1" through the corresponding test button and the time point at which the user subsequently selects the channel "6" through the corresponding test button is equal to 15 sec and to obtain that the intervals between the time point at which the user selects the channel "6" through the corresponding test button and the time point at which the user subsequently selects the channel "9" through the corresponding test button is equal to 20 sec, the television may preferably select the longest interval among the two intervals between the input time points related to the test buttons to serve as the time interval for the controlled terminal to respond to the input operations. Specifically, the time interval is set to 20 sec.

Figure 7:
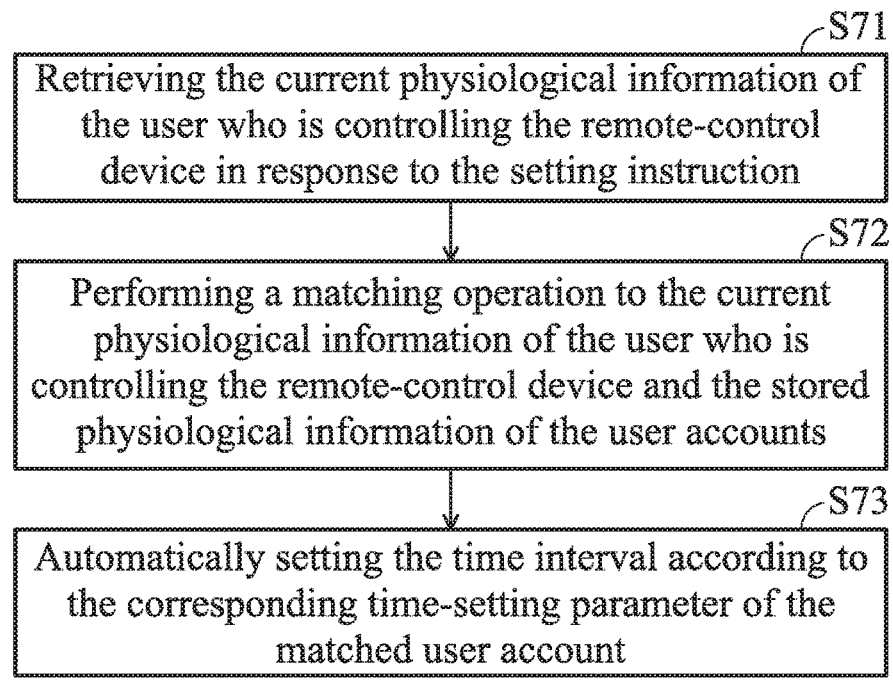
FIG. 7 shows a seventh exemplary embodiment of a control method for a controlled terminal.

Referring to FIG. 7, in an embodiment, the step of setting the time interval for the controlled terminal to respond to the input operations of the remote-control device according to the setting instruction can be accomplished through an account-binding manner. In detail, the controlled terminal comprises at least two user accounts, and each user account stores the physiological information and the time-setting parameter of the corresponding user. By identifying the current physiological information of the user who is controlling the remote-control device, the corresponding time interval is retrieved to serve as the time interval for the controlled terminal to respond to the input operations. The step may specifically comprise the following steps:

Step S71: retrieving the current physiological information of the user who is controlling the remote-control device in response to the setting instruction.

Step S72: performing a matching operation to the current physiological information of the user who is controlling the remote-control device and the stored physiological information of the user accounts;

Step S73: automatically setting the time interval according to the corresponding time-setting parameter of the matched user account.

In the embodiment, the physiological information preferably comprises at least one of fingerprint information and iris information, however, without limitation.

In the embodiment, after the matching user account is obtained and the corresponding time-setting parameter is retrieved, the setting method of the time interval is similar to the steps of the embodiment in FIG. 5. By implementing the embodiment, the time interval can be set according to different users, which provides the personalized television-usage environment for the users. Compared with the embodiments in FIGS. 3-6, automatically setting the time interval according to the physiological information can reduce the manual operations performed by the users, which results in high automation operation and a better user experience.

Figure 8:
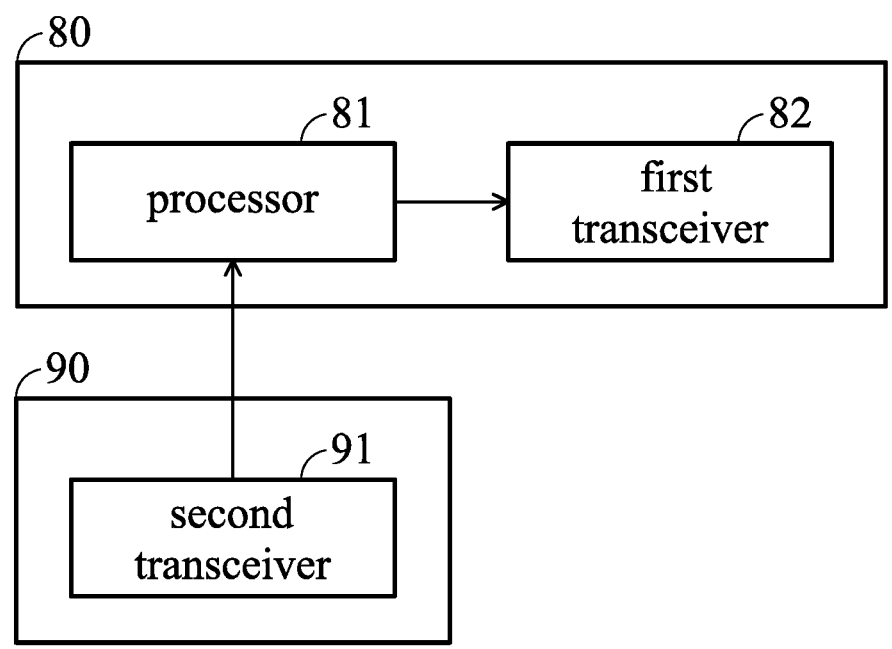
FIG. 8 shows an exemplary embodiment of a controlled terminal and a remote-control device.

An exemplary embodiment provides a controlled terminal and a remote-control device. As shown in FIG. 8, the controlled terminal 80 comprises a processor 81 and a first transceiver 82. The remote-control device 90 comprises a second transceiver 91.

The second transceiver 91 is configured to transmit a setting instruction from the user to the controlled terminal 80.

The first transceiver 82 receives the setting instruction from the user. The processor 81 is configured to set a time interval for the controlled terminal to respond to input operations for the remote-control device 90 and processes the input operations of the remote-control device 90 according to the time interval.

The operation of the first transceiver 82 receiving the setting instruction and the operation of the processor 81 setting the time interval for the controlled terminal to respond to input operations for the remote-control device 90 can be performed according to at least one of the embodiments of FIGS. 2-7, thus, the related description is omitted here.

According to some embodiments, the controlled terminal 80 may only comprise the processor 81 without the first transceiver 82. In these embodiments, the controlled terminal 80 does not receive the setting instruction from the user through the remote-control device 90. The setting instruction may be directly provided from the user though the controlled terminal 80.

According to the above-described embodiments, the time interval of the controlled terminal to respond to the input operations of the remote-control device can be flexibly set according to the setting instruction, such that the process which is performed by the controlled terminal in response to the input operations conforms with the expectation of the user, and the user experience is improved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a controlled terminal comprising:
receiving a setting instruction for setting a time interval for channel-selection operation customized for a user;
dynamically setting the time interval, wherein the controlled terminal responds to normal input operations from a remote-control device according to the time interval; and
processing the normal input operations from the remote-control device according to the time interval, the time interval is set or selected in order to provide a particular user adequate time to enter a plurality of commands;
wherein the step of dynamically setting the time interval comprises:
enabling a clocking function in response to the setting instruction;
clocking a plurality of input time points respectively at which receiving a plurality of input setting instructions from the remote-control device, wherein the plurality of input setting instructions from the remote-control device are active by pressing test buttons of the remote-control device; and
defining the time interval according to intervals between the plurality of input time points;

wherein the setting instruction at least comprises a first setting instruction and a second setting instruction, and the step of dynamically setting the time interval comprises:
   in response to the first setting instruction, displaying the time interval of the controlled terminal; and
   in response to the second setting instruction, shortening or lengthening the time interval.

2. The control method as claimed in claim 1, wherein the step of dynamically setting the time interval comprises:
   analyzing a time-setting parameter from the setting instruction; and
   setting the time interval according to the time-setting parameter.

3. The control method as claimed in claim 1, wherein the controlled terminal is implemented by a display terminal, the input operations are implemented by a channel-selection instruction, and the step of processing the input operations from the remote-control device according to the time interval comprises:
   receiving and storing first number-button information;
   when second number-button information which is subsequently input is received in the time interval, storing the second number-button information and performing the channel-selection operation by using a combination of the first number-button information and the second number-button information;
   when the second number-button information which is subsequently input after the second number-button information is not received in the time interval, performing the channel-selection operations by using the first number-button information.

4. A controlled terminal comprising:
   a transceiver or a receiver configured to receive a setting instruction,
   a processor configured to dynamically set a time interval for channel-selection operation customized for a user based on the setting instruction, wherein the controlled terminal responds to normal input operations from a remote-control device according to the time interval, and to process the normal input operations from the remote-control device according to the time interval, the time interval is set or selected in order to provide a particular user adequate time to enter a plurality of commands;
   wherein the processor is configured to enable a clocking function in response to the setting instruction, to clock a plurality of input time points respectively at which a plurality of test buttons of the remote-control device are pressed, and to define the time interval according to intervals between the plurality of input time points at which the plurality of test buttons are pressed;
   wherein the setting instruction at least comprises a first setting instruction and a second setting instruction, and the processor is configured to display the time interval of the controlled terminal in response to the first setting instruction and to shorten or lengthen the time interval in response to the second setting instruction.

5. The controlled terminal as claimed in claim 4, wherein the processor is configured to analyze a time-setting parameter from the setting instruction and to set the time interval according to the time-setting parameter.

6. The controlled terminal in claim 4,
   wherein the controlled terminal is implemented by a display terminal, the input operations are implemented by a channel-selection instruction,
   wherein the processor is configured to receive and store first number-button information;
   wherein when second number-button information which is subsequently input is received by the controlled terminal in the time interval, the processor is configured to store the second number-button information, and perform the channel-selection operation by using a combination of the first number-button information and the second number-button information
   wherein when second number-button information which is subsequently input after the second number-button information is not received by the controlled terminal in the time interval, the processor is configured to perform the channel-selection operations by using the first number-button information.

* * * * *